(12) United States Patent
Burfield et al.

(10) Patent No.: US 6,363,362 B1
(45) Date of Patent: Mar. 26, 2002

(54) TECHNIQUE FOR INTEGRATING ELECTRONIC ACCOUNTING SYSTEMS WITH AN ELECTRONIC PAYMENT SYSTEM

(75) Inventors: Christopher B. Burfield, Worthington, OH (US); Alan C. Van Ness, Norcross, GA (US)

(73) Assignee: CheckFree Services Corporation, Norcross, GA (US)

( * ) Notice: Subject to any disclaimer, the term of this patent is extended or adjusted under 35 U.S.C. 154(b) by 0 days.

(21) Appl. No.: 09/287,284

(22) Filed: Apr. 7, 1999

(51) Int. Cl.[7] .............................................. G06F 17/60
(52) U.S. Cl. ............................. 705/40; 705/39; 705/34
(58) Field of Search ............................ 705/40, 42, 39, 705/34, 43; 235/379; 707/2, 104.1, 3–100

(56) References Cited

U.S. PATENT DOCUMENTS

| | | | |
|---|---|---|---|
| 4,385,285 A | * 5/1983 | Horst et al. ................. | 382/119 |
| 4,989,141 A | 1/1991 | Lyons et al. ................ | 364/408 |
| 5,121,945 A | * 6/1992 | Thomson et al. ............. | 283/58 |
| 5,220,501 A | 6/1993 | Lawlor et al. .............. | 364/408 |
| 5,283,829 A | 2/1994 | Anderson .................... | 380/24 |
| 5,325,290 A | 6/1994 | Cauffman et al. ........... | 364/401 |
| 5,326,959 A | 7/1994 | Perazza ...................... | 235/379 |
| 5,336,870 A | 8/1994 | Hughes et al. .............. | 235/379 |
| 5,341,429 A | 8/1994 | Stringer et al. .............. | 380/23 |
| 5,383,113 A | 1/1995 | Kight et al. ................ | 364/401 |
| 5,420,405 A | 5/1995 | Chasek ....................... | 235/379 |
| 5,465,206 A | 11/1995 | Hilt et al. ................... | 364/406 |
| 5,699,528 A | 12/1997 | Hogan ........................ | 395/240 |
| 5,727,249 A | 3/1998 | Pollin ......................... | 705/40 |
| 5,884,288 A | * 3/1999 | Chang et al. ................ | 705/40 |
| 5,963,925 A | * 10/1999 | Kolling et al. .............. | 705/40 |
| 6,029,150 A | * 2/2000 | Kravitz ........................ | 705/39 |
| 6,223,168 B1 | * 4/2001 | McGurl et al. ............... | 705/40 |

FOREIGN PATENT DOCUMENTS

| | | | |
|---|---|---|---|
| EP | 1083478 A2 | 8/2000 | ............ G06F/3/12 |
| FR | 2679404 | 7/1991 | .......... H04N/11/06 |
| WO | US97/240000 | 12/1997 | ............ H04K/1/00 |
| WO | US98/17329 | 8/1998 | ........... G06F/17/60 |
| WO | 99/42944 | * 8/1999 | ......... G06F/157/00 |

OTHER PUBLICATIONS

"Electronic bill presentment", by Steven Amrlin, Bank Systems & Technology, v35n7 pp. 28–32 Jul. 1998.*

* cited by examiner

*Primary Examiner*—Vincent Millin
*Assistant Examiner*—Jeffrey Pwu
(74) *Attorney, Agent, or Firm*—Alfred Stadnicki

(57) ABSTRACT

A technique is provided for paying bills electronically using data generated by any of multiple accounting software packages. The data generated by each accounting software package has a different structure. Respective rules associated with each accounting software package are stored. Structured data including data corresponding to a payee name, a payee address, an invoice number and an invoice amount generated by one of the accounting software packages is received. The data corresponding to the payee name, the payee address, the invoice number and the invoice amount is extracted from the received structured data by applying only the respective rules associated with the applicable accounting software package. The extracted data is mapped such that the extracted data corresponding to the payee name is identified as first type data, the extracted data corresponding to the payee address is identified as second type data, the extracted data corresponding to the invoice number is identified as third type data, and the extracted data corresponding to the invoice amount is identified as fourth type data. Representations of the extracted data corresponding to the payee name, the payee address, the invoice number, and the invoice amount are stored in a database at first, second, third and fourth locations, respectively, based upon the identified type of the particular data. The representations of the extracted data are read from the database and processed to electronically process payment of the invoice amount.

26 Claims, 5 Drawing Sheets

TECHNIQUE FOR INTEGRATING ELECTRONIC ACCOUNTING SYSTEMS WITH AN ELECTRONIC PAYMENT SYSTEM

TECHNICAL FIELD

The present application relates generally to electronic commerce and more particularly to a method and system for providing integrated electronic accounting and bill payment.

BACKGROUND ART

With the proliferation of desktop computing devices, such as personal computers, numerous functions which were previously handled manually are now performed electronically. A prime example of such computerization relates to accounting and bill payment. Numerous vendors have developed desktop computing software which can be utilized to maintain accounting records and perform accounting functions.

In a typical accounts payable application, the software can be used to track invoices and print payment checks. In lieu of payment by check, payments could be made via wire transfers by communicating, typically over voice lines, instructions to transfer deposited credited funds of the payor maintained at a financial institute to a deposit account of a payee maintained at another financial institute.

More recently, it has become possible to electronically pay bills by communicating instructions, typically via the Internet, to a financial institute maintaining deposited or credited funds of the payor, or to a financial institute representative. The payments are then made to the payee by the financial institute or its representative. Funds from the payor's deposit or credit account are debited by the financial institute to cover the payment. The payment by the financial institute or its representative to the payee can be made in any number of ways.

For example, the financial institute or representative may electronically transfer funds from the payor account to the payee account, may electronically transfer funds from a financial institute/representative account, e.g. a payment funds account, to the payee account, may prepare a paper draft on the financial institute/representative account and mail it to the payee, may prepare an electronically printed paper check on the payor's account and mail it to the payee, or may make a wire transfer from either the financial institute/representative account or payor account. If the funds transferred to the payee are drawn from the financial institute/representative account, funds from the payee account are electronically or otherwise transferred by the financial institute to the financial institute/representative account to cover the payment. Further, if the payment will be made from funds in the financial institute/representative account, the payment will preferably be consolidated with payments being made to the same payee on behave of other payors.

Accordingly, such electronic bill payment systems eliminate the need for a payor to write or print paper checks and then forward them by mail to the payee. This makes it easier and more efficient for the payor to make payments. Payees receiving consolidated payments, will no longer have to deal with checks from each payee and therefore can process payments more efficiently. The making of payments by the electronic transfer of funds provides even further efficiencies in payment processing by payees. It has become well recognized that making payments electronically can significantly reduce the cost of processing payments for both the payor and payee.

Because electronic bill payment services are generally provided by other than providers of accounts payable software, to pay bills electronically a payor must somehow transfer data output from the particular accounting software application being utilized to the electronic bill payment system. One way to do this is to manually input data generated by the accounting software application to the electronic bill payment system. Manual transfer is a tedious and error prone process.

Another alternative is to develop specialized software to electronically transfer the data generated by the accounting software application to the electronic bill payment system in order to seamlessly provide for electronic payments based upon information generated by accounts payable software. Hence, it has been proposed to supplement existing accounts payable software with an export utility which can translate payment data generated under the direction of the accounting software so that it can be processed by an electronic bill payment system.

To implement this proposal, it is necessary to send the vendor, payment and perhaps other files, which exists in the database of the accounts payable system, from the accounts payable system to the electronic bill payment system. These files include information such as payment dates, payment amounts and remittance information detailing how the payment is to be applied, e.g. references to multiple invoice numbers, multiple invoice amounts, discount amounts, adjustments etc., which is required for electronic bill payment.

Hence, it has been proposed to program electronic bill payment systems to perform a database query on a new database created with using the data output from the applicable accounts payable system and to import the above files from this new database for use in performing electronic bill payment processing. However, this will require that the user create and store the files which include the information required by the electronic bill payment system so as to be importable and used by the applicable electronic bill payment system. This in turn will require users to modify their current procedures. Developing specialized software can be expensive. Moreover, because each electronic accounting system typically outputs differently structured data and each electronic payment system typically requires differently structured data, any software developed to create and store data in the developed database will be useless if the user wishes to switch accounting software applications or electronic bill payment systems.

To avoid requiring procedural changes by users and the other problems mentioned above, it has been further proposed to program the electronic bill payment system to enter the pre-existing database files of the accounts payable system and import the necessary information. In view of the numerous different types of accounts payable software applications currently in use, this would require that the electronic bill payment system have specialized instructions for accessing the files in the differently structured databases of each type of accounts payable system. Hence, the implementation of this proposal would at best be very cumbersome and is likely to be prone to errors and anomalies in operation.

Accordingly, a need remains for a technique which will allow the practical integration of accounting and electronic bill payment systems.

OBJECTIVES OF THE INVENTION

It is therefore and object of the present invention to provide integrated electronic accounting and bill payment.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a system is provided for electronically paying bills using data generated by any of multiple different programmed accounting instructions, i.e. different accounting software packages, where the data generated by each of the programmed accounting instructions has a different structure. The system may, for example, be a programmed personal computer (PC) or workstation. The system includes a processor and a floppy or hard disk, compact disk (CD) and/or other type local or networked memory, for storing one or more of the different programmed accounting instructions. That is, the memory stores respective rules for one, some or all of the different accounting instructions that could be used to generate the data needed for electronically paying bills. The memory also stores programmed mapping instructions and programmed import instructions. The programmed mapping instructions include respective rules associated with each of the stored accounting instructions.

The processor, in accordance with particular programmed accounting instructions stored in memory, generates structured accounting data for making payment on one or more bills. The structured accounting data includes data corresponding to a payee name, a payee address, an invoice number(s), an invoice amount(s), and typically other data, as is well understood in the art.

The processor, applies the stored rules associated with the applicable accounting instructions to extract the data corresponding to the payee name, the payee address, the invoice number(s) and the invoice amount(s) from the structured data. Other data required making payments of bills will also be extracted. Beneficially, the rules associated with each of the programmed accounting instructions identify locations of the data corresponding to the payee name, the payee address, the invoice number(s) the invoice amount(s), and other desired information within the structured data generated in accordance with the applicable accounting instructions. In such case, the processor extracts the desired data based upon its location within the structured data.

Conventional programmed accounting instructions typically include instructions for printing checks using the generated structured accounting data. Hence, a user may input a print command, and the system processor, in accordance with the applicable instructions, will direct the structured data to a designated printer for printing as a properly formatted check drawn against the user's account at a financial institute. The check can then be sent, typically by mail, to the payee.

In a particularly advantageous implementation of the present invention, the locations from which the desired data are extracted are those at which the data would appear on a check printed in accordance with the applicable accounting instructions. More specifically, the processor, in accordance with the mapping instructions, provides a "virtual printer" option which can be selected by the user, typically using a keyboard, mouse or other input device. Hence, the processor can receive a command representing the selection of the real printer or the "virtual printer".

If the user selects the real printer option, the print function is performed in accordance with the applicable accounting instructions. However, if the "virtual printer" option is selected, the processor begins performance of the electronic bill processing function. In the later case, the processor, in accordance with the rules associated with the applicable accounting instructions, extracts the data as described above.

The locations from which the data is extracted may be identified by the X-Y coordinates that define the areas in which the data corresponding to the payee name, the payee address, the invoice number(s) and the invoice amount(s) would appear on a check printed in accordance with the structured data. If desired, the mapping instructions can be implemented so as to cause the processor to perform both the print function and electronic bill payment function responsive to selection of the "virtual printer". However, in such a case, the printed check will serve only as a hard copy record of the electronic payment.

The processor, in accordance with the programmed import instructions, stores, in the memory, a database having a representation of the extracted data corresponding to the payee name at a first location, a representation of the extracted data corresponding to the payee address at a second location, a representation of the extracted data corresponding to the invoice number(s) at a third location, and a representation of the extracted data corresponding to the invoice amount(s) at a fourth location. The type of data determines the location where the representation of that data is stored in the database, notwithstanding the particular programmed accounting instructions which were used to generate the data.

For example, prior to storing the extracted data, the processor may map the extracted data such that the extracted data corresponding to the payee name is identified as first type data, the extracted data corresponding to the payee address is identified as second type data, the extracted data corresponding to the invoice number(s) is identified as third type data, and the extracted data corresponding to the invoice amount(s) is identified as fourth type data. In such a case, each of the representations of the extracted data is then stored at a respective location in the database based upon its identification as a particular type of data.

The processor transmits the database to an electronic bill payment processor, typically a network server located elsewhere on the network, for processing the representations of the extracted data to electronically pay the bill. The electronic bill payment processor is configured to read the representations of the extracted data from the transmitted database and process these representations to electronically process payment of the invoice amount(s).

To obtain further efficiency, the memory preferably stores multiple digital signatures, each corresponding to a different payee name and address. The processor, in accordance with the programmed import instructions, forms a digital signature using the extracted data corresponding to the payee name and the extracted data corresponding to the payee address. By comparing the formed digital signature to the stored digital signatures, the processor can determine if the formed digital signature matches one of the stored digital signatures. If not, the processor, in accordance with the import instructions, stores the formed digital signature as part of the stored multiple digital signatures. If a match is found, the processing continues using the previously stored digital signature or other associated data as will be further described below.

The processor, in accordance with the programmed import instructions, may also store, in the memory, a reduced character representation of the extracted data corresponding to the payee name and/or the payee address in association with the digital signature. This may, for example, be necessary to conform the applicable extracted data to the bit length requirements of the electronic bill payment processor for the particular extracted data type. Preferably, each reduced character representation is first generated by the processor in accordance with the import instructions and then displayed to the user for acceptance or modification. If a matched digital signature has an associated reduced character representation, the processor, in accordance with the import instructions, retrieves the reduced character representation from the memory and stores it as the representation of the applicable extracted data at the proper location in the database. In such a case, the reduced character representation of the extracted data, rather than full length data, corresponding to the payee name and/or the payee address is transmitted to the electronic bill payment processor.

It will be recognized that, if so desired, the mapping instructions and the import instructions could be stored on a networked memory accessible via a network server, such as one which processes electronic bill payments, rather than on local memory at individual client stations. In such a case, the structured accounting data would be directed by the client processor to the server. The server would then extract data, store a representation of the extracted data in the database, and perform the other functions as described above. Hence, it should be understood that the above-described processor could be multiple processors and the above-described memory could be memory associated with multiple processors. I should also be recognized that the above-described functions could be split between different processors in any number of ways.

In one practical implementation, each of a number of client stations store the rules associated with multiple different programmed accounting instructions. One of the client stations generates, in accordance with first programmed accounting instructions, first accounting data having a first structure. The station retrieves the respective rules associated with the first programmed accounting instructions from its associated memory and extracts the data corresponding to the payee name, payee address, first invoice number(s) and first invoice amount(s) from the structured first data by applying the retrieved rules.

The station then maps the extracted data such that the extracted data corresponding to the payee name is identified as first type data, the extracted data corresponding to the payee address is identified as second type data, the extracted data corresponding to the first invoice number(s) is identified as third type data, and the extracted data corresponding to the first invoice amount(s) is identified as fourth type data. The station directs the storage of a representation of the extracted data corresponding to the payee name in a first database at a first location based upon such data being identified as the first type data, of a representation of the extracted data corresponding to the payee address in the first database at a second location based upon such data being identified as the second type data, of a representation of the extracted data corresponding to the first invoice number(s) in the first database at a third location based upon such data being identified as the third type data, and of a representation of the extracted data corresponding to the first invoice amount(s) in the first database at a fourth location based upon such data being identified as the fourth type data.

Another of the client stations generates second data having a second structure, in accordance with second programmed accounting instructions. The second structure is different than the first structure. This station retrieves, from its associated memory, the respective rules associated with the second programmed accounting instructions, and extracts the data corresponding to the same payee name, the same payee address, second invoice number(s) and second invoice amount(s) from the structured second data by applying the retrieved rules associated with the second programmed accounting instructions.

This other station then maps the extracted data such that the extracted second data corresponding to the payee name is identified as first type data, the extracted data corresponding to the payee address is identified as second type data, the extracted data corresponding to the second invoice number(s) is identified as third type invoice number data, and the extracted data corresponding to the second invoice amount(s) is identified as fourth type data. The station next directs the storage of a representation of the extracted data corresponding to the payee name in a second database at the first location based upon such data being identified as the first type data, of a representation of the extracted data corresponding to the payee address in the second database at the second location based upon such data being identified as the second type data, of a representation of the extracted data corresponding to the second invoice number(s) in the second database at the third location based upon such data being identified as the third type data, and of a representation of the extracted data corresponding to the second invoice amount(s) in the database at the fourth location based upon such data being identified as the fourth type data.

A bill payment server, which is typically interconnected to the client stations by a public network, such as the Internet, reads the representations of the extracted data at the first, second, third and fourth locations from the first database and the representations of the extracted data at these same locations from the second database. The server then processes the read representations to electronically direct a single payment, which includes the first and the second invoice amounts, to the named payee at the designated payee address.

Preferably, each client station includes a user-input device for receiving a user printer selection, i.e. a selection representing a real printer or a "virtual printer". Each client station extracts the data, maps the extracted data, and directs storage of the representations of the extracted data responsive to the user selection of the "virtual printer".

Each client station's associate memory preferably stores multiple digital signatures respectively corresponding to a different payee name and address. Each client station's associate memory may also beneficially store a reduced character representation of the extracted data payee name data and/or the extracted payee address data in association with one or more of the stored digital signatures. It should be noted that each of the reduced character representations associated with the identical digital signatures stored in the memories of different client stations may be different.

BEST MODE FOR CARRYING OUT THE INVENTION

Figure 1:
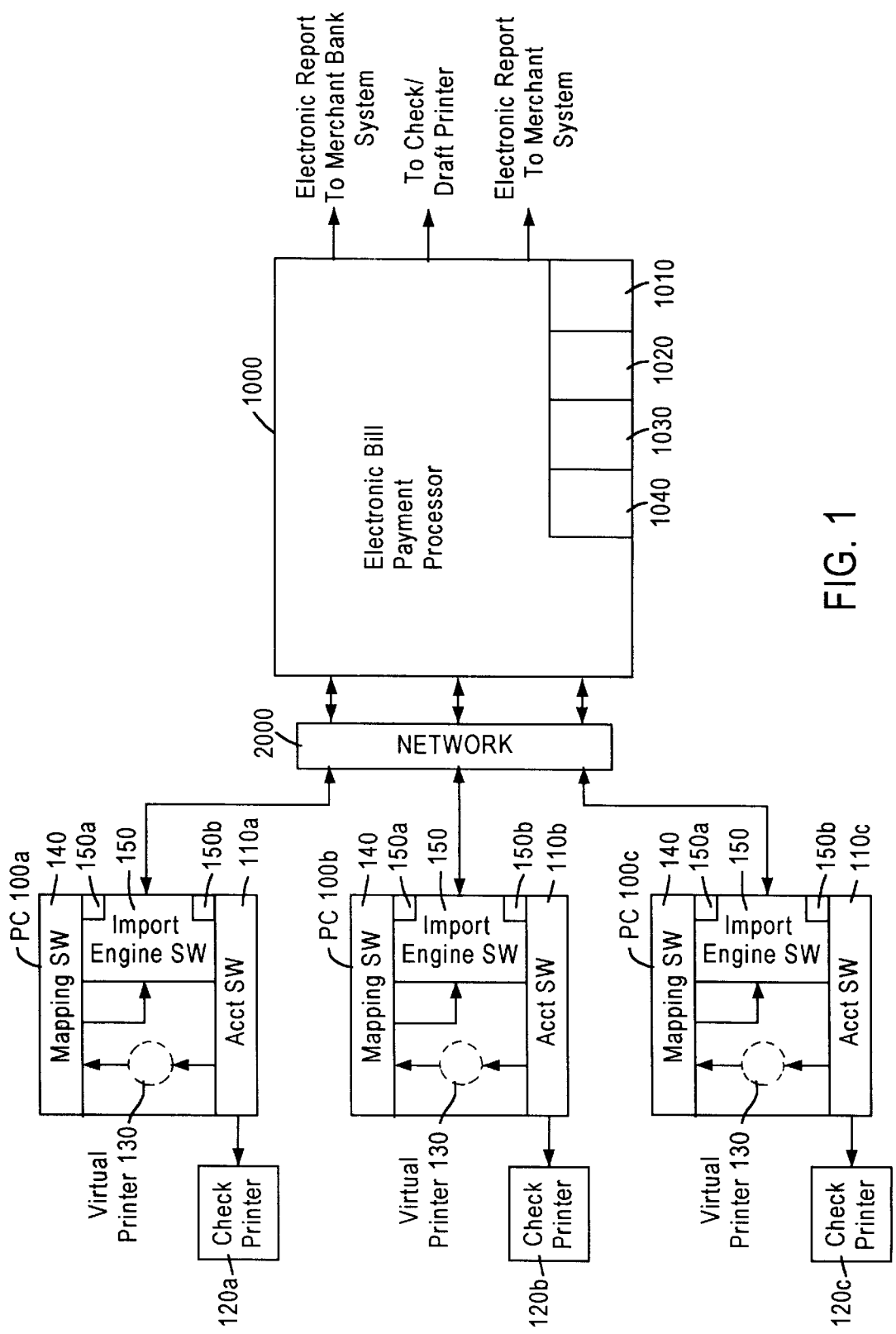
FIG. 1 depicts an integrated electronic accounting and bill payment system in accordance with the present invention.

As shown in FIG. 1, an integrated electronic accounting and bill payment system is depicted. The system includes multiple personal computers (PC's) 100a–100c which operate, in accordance with accounting software 110a–110c, to perform account payable functions including the generation of data which can be directed to a check printer 120a–120c to print hard copy payment checks and remittance information for forwarding to payees. It should be noted that the accounting software 110a, 110b and 110c are of different types and that the data generated by the associated PC in accordance with each software application is differently structured and results in differently formatted payment checks and remittance information being printed. All of the above-described components are typically found in a conventional accounts payable system.

To integrate the accounts payable processing with electronic bill payment processing, a virtual printer 130a–130c is provided, which can be selected from the printer menu (not shown) to direct the data which would otherwise be directed to the applicable check printer 120a–120c by the applicable accounting software 110a–110c to the mapping software. By providing a virtual printer selection option, a user can simply redesignate the printer from the check printer 120a–120c to the virtual printer 130 to redirect the data generated in accordance with the accounting software for electronic bill payment processing. Alternatively, selection of the virtual printer option could, if desired, be used to direct the generated data to both the real and virtual printers, in which case the printed check and remittance information document would be used as a hard copy record of the payment which would actually be made electronically.

More particularly, the virtual printer 130 allows a user, in a Windows™ environment, to redirect or co-direct the print output from the applicable accounting software package 110a–110c to the mapping software 140 to create an unstructured data record that can be interpreted by the import engine software 150. The virtual printer 130 takes advantage of the way that Windows™ creates printed output, which is to print "blocks" of information at specific points on a page. The way in which Windows™ specifies the points is based on the resolution of the printer—commonly 300 dots per inch. As a result, the printed page effectively becomes an X,Y grid, with the origin (0,0) at the upper left-hand corner of the print area. As the X coordinate increases, the point at which the block is printed moves horizontally to the right. As the Y coordinate increases, the point at which the block is printed moves vertically down the page.

The virtual printer option is unique in that it allows extraction of the data such that not only the data elements that make up the contents of each block of data, but also the X,Y coordinates of each block, are extracted. The advantage of this, as it relates to extracting information printed on financial forms, is that the areas in which specific pieces of such information are printed are very restricted on the forms. That is, accounting software packages are developed recognizing that the check amount must be printed in a box that is typically on a pre-printed check form. Hence, the X,Y location for this specific information does not dramatically change, regardless of whether the user changes the font or font size that the form is printed in.

To the user, the virtual printer appears simply as another printer option on the Windows™ control panel, just like the real printer to which documents could be directed to print either on a local or networked printer. The user simply selects the virtual printer 130 as the target for the check and remittance information output from the account software package 110a–110c, and the unstructured record containing the information and locations thereof is automatically created by the mapping software 140. More specifically, the PC's 100a–100c process the data directed to the virtual printer 130 in accordance with mapping software 140. Although the mapping software 140 is shown to reside on the respective PC's 100a14 100c, it should be noted that, if desired, the mapping software 140 could be located with the electronic bill payment processor 1000.

As discussed above, the use of the virtual printer 130 is particularly suitable for Windows™ based applications but may not be suitable for non-Windows™ based accounting software. However, other techniques known to those skilled in the art could be used to provide the mapping software 140 with data from non-Windows™ based accounting software, such as DOS™ based accounting software. In any event, notwithstanding how the data is received by the mapping software 140, the received data is processed in the manner described above.

Figure 2A:
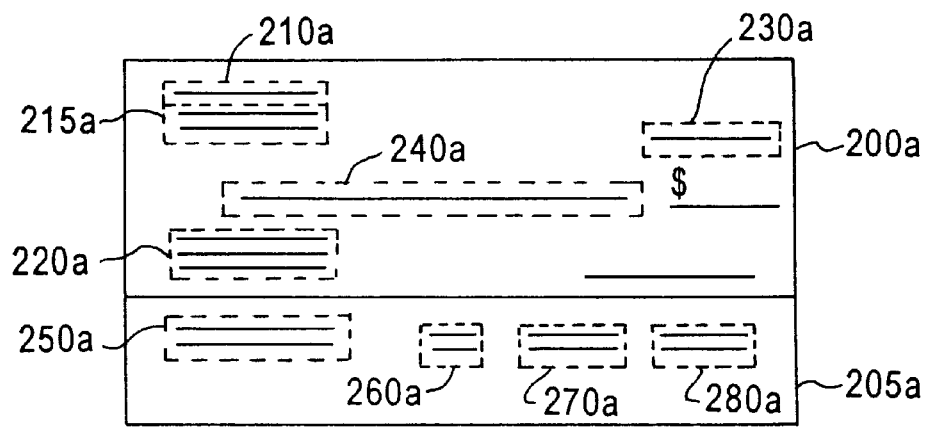
FIG. 2A depicts an electronically printed check formatted by a first type of accounting software package.
Figure 2B:
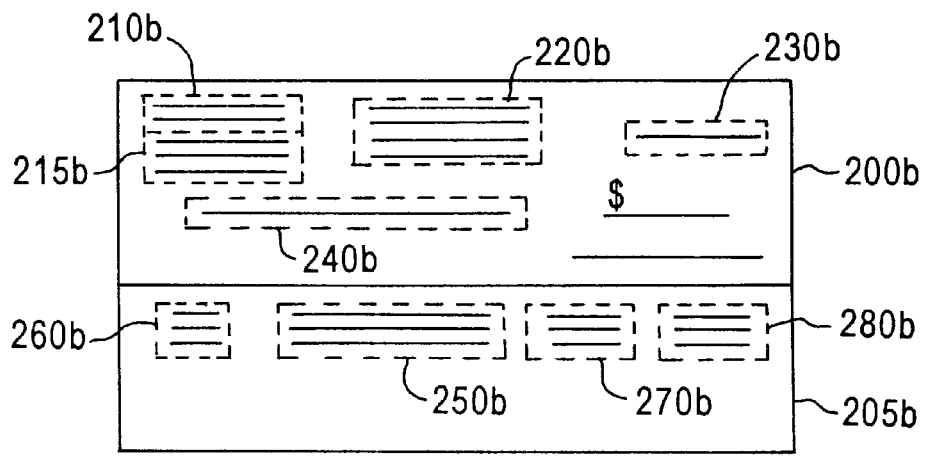
FIG. 2B depicts an electronically printed check formatted by a second type of accounting software package.
Figure 2C:
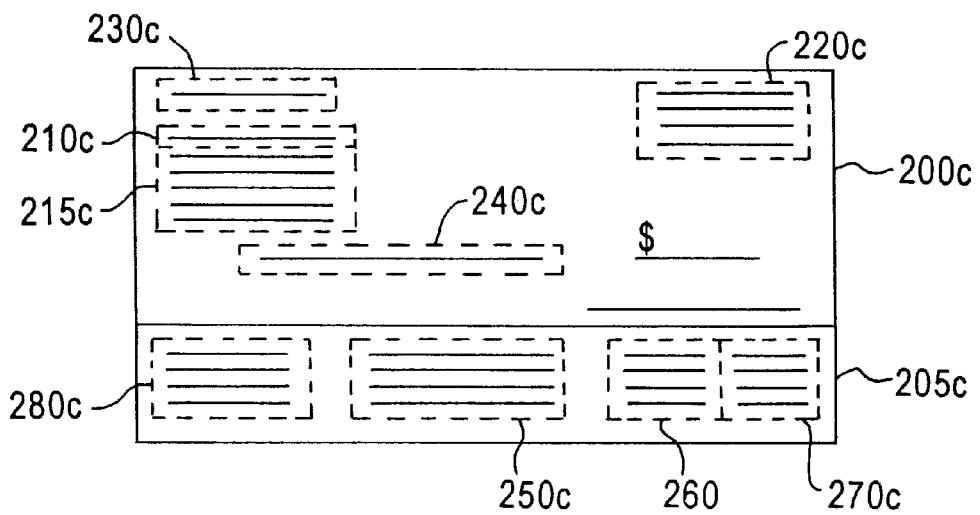
FIG. 2C depicts an electronically printed check formatted by a third type of accounting software package.

Preferably, for Windows™ based accounting software, the mapping software 140 maps the received data based upon the XY coordinate location of the data as shown in FIGS. 2A–2C. For non-Windows™ based accounting software applications, the mapping software 140 preferably reads the received data in the same manner but with the X coordinate being set to zero and the Y coordinate being the number of the line of data in its received order. Accordingly, data received from both Windows™ based and non-Windows™ based accounting software packages can be read in precisely the same way.

Further, certain accounting software may provide data in a form in which multiple different pieces of information are included in a single data segment. For example, referring to FIGS. 2A–2C, all of the remittance data may be blocked as a single line of data for each invoice rather than individually blocking data representing the invoice numbers, invoice dates, invoice amounts and payment amounts for all invoices, as shown in the Figures. If line blocking will be used, the mapping software 140 will identify each of the four types of data, i.e. the invoice number, invoice date, invoice amount or payment amount, from each line of data. Hence, the mapping software 140 is capable of parsing data from a line as well as a column of data.

As shown in FIGS. 2A–2C, the data transmitted by the PC's 110a–110c to the applicable check printer 120a–120c, in accordance with the applicable accounting software 110a–110c, will, depending on the particular accounting software package, cause the check printer 120a–120c to print specific types of information in specific predefined areas. For example, as shown in FIGS. 2A–2C, the checks 200a–200c and the associated printed remittance information documents 210a–210c, which are typically printed with the checks and removably attached thereto, have identical information printed in different predefined areas. The mapping software 140 maps this data based upon the location at which it would appear on the check or remittance information document in accordance with the particular accounting software package 100a–100c being utilized.

More particularly, as shown in FIG. 2A, the data generated by PC 100a, in accordance with the accounting software package 100a, is directed to the check printer 120a. The check printer 120a, based upon this data, prints the payee's name in area 210a, the payee street address, city, state, zip code and country in an area 215a, the payor name, street or post office address, city, state and zip code in the area 220a, the date in the area 230a and the payment amount in area 240a of the check 200a. The remittance information document 205a is printed so as to have the invoice number (s) in the area 250a, the invoice date(s) in the area 260a, the invoice amount(s) in the area 270a, and the remittance amount(s) in area 280a.

As shown in FIG. 2B, areas 210b and 215b on check 200b, which are larger than areas 210a and 215a on check 200a, are printed with the payee information in accordance with the accounting software 110b operating on PC 100b. An area 240b, which is somewhat smaller than the area 240a, is printed with the payment amount on check 200b. The payor name and address are printed in area 220b, and the check date is printed in the area 230b, of check 200b. As shown, the locations of the invoice number(s) and date(s), respectively printed in areas 250b and 260b on remittance document 205b, are reversed from areas 250a and 260a which included similar type information on check 200a. The areas 270b and 280b, which are respectively printed with the invoice amount(s) and remittance amount(s), are also different than the areas 270a and 270b which provide similar information on document 205a.

Referring now to FIG. 2C, the payee name and address information is printed in a areas 210c and 215c, the payor information in an area 220c, the date information in an area 230c, and the amount information in an area 240c of the check 200c based upon the data generated by PC 100c in accordance with the accounting software 110c. Here again, it should be noted that the information differs in location on check 200c from that of checks 200a and 200b. Likewise, an area 250c is printed with invoice number(s), 260c with invoice date(s), 270c with invoice amount(s) and 280c with the remittance amount(s) on the remittance information document 205c. Hence, the locations of this information also vary on document 205c from the location of similar information printed on documents 205a and 205b.

Accordingly, the PC 100a–100c, in accordance with appropriate instructions in mapping software 140, maps the data generated by the accounting software 110a–110c being utilized, based upon the area in which pertinent information represented by the data is printed in accordance with the applicable accounting software 110a–100c. To identify the applicable accounting software 110a–110c, the PC 100a–100c, in accordance with the mapping software 140, may query the user for user input identifying the accounting software. The mapping software could, alternatively, implement an algorithm to automatically identify the accounting software, as will be understood by those skilled in the art.

For example, referring again to FIG. 2A, the data generated by the accounting software 110a which represents the information located in area 210a is defined by the mapping software 140 to be the payee's name, the data representing the information located in area 215a is defined as the payee address, the data representing the information located in area 240a is defined as the payment amount, the data representing the information located in area 250a is defined as the invoice number(s), the data representing the information shown in area 260a is identified as the invoice date(s), the data representing the information which is printed in the area 270a is identified as the invoice amount(s) and the data representing the information in area 280a is identified as the remittance amount(s). Similar information in the applicable areas shown in FIGS. 2B and 2C would be likewise identified by mapping the representing this information based upon the areas in which the information would appear on the applicable check or remittance information document if actually printed. Hence, by identifying, in the mapping software 140, the particular areas where pertinent information is printed on checks and remittance information documents generated in accordance with the applicable accounting software 100a–100c, all necessary information to electronically process payments can be extracted and defined, i.e. identified, from within the data stream which is output by the accounting software 110a–110c and directed to the "virtual printer". Accordingly, unstructured records of mapped data can be created by PC's 100a–100c operating mapping software 140.

Figure 3:
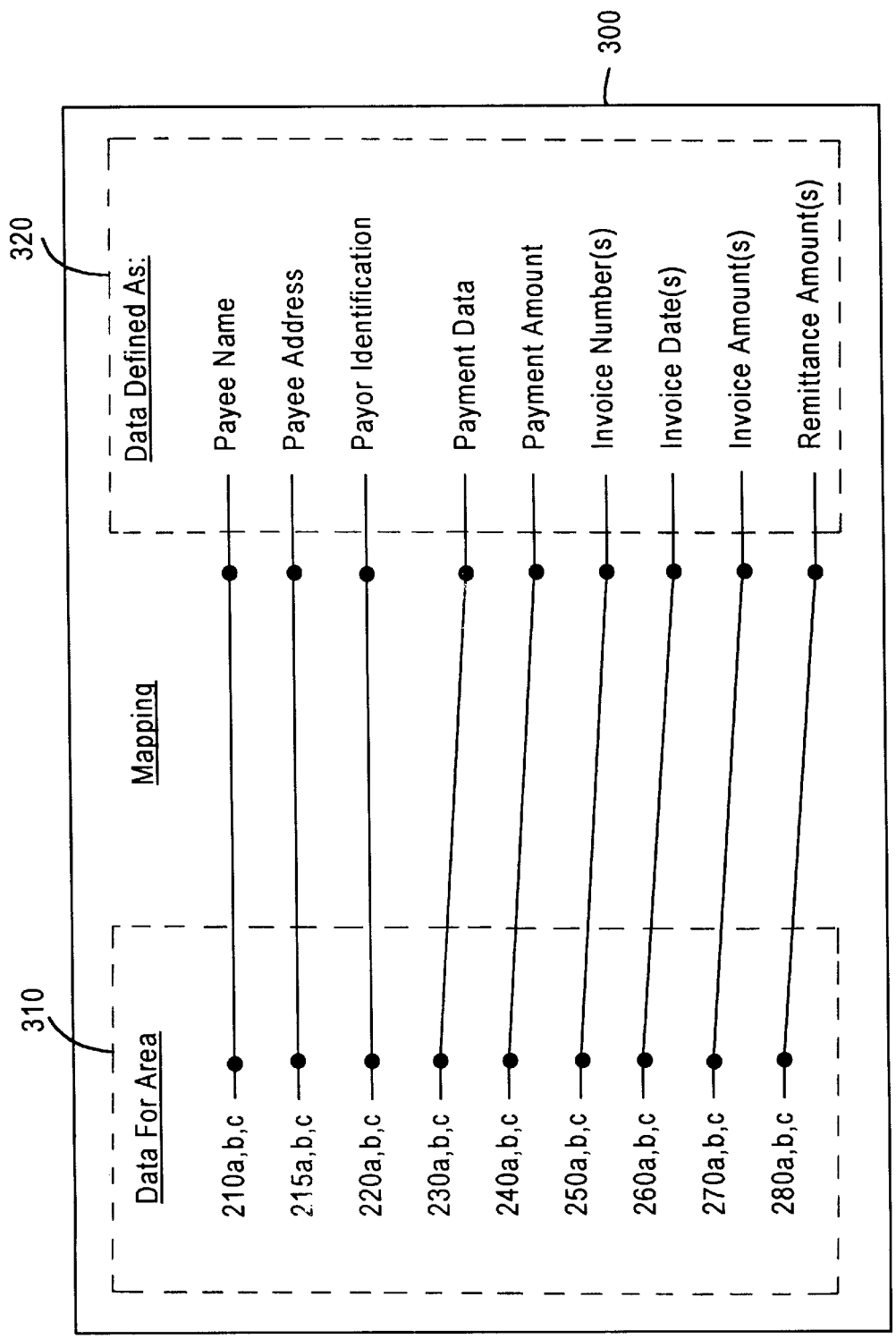
FIG. 3 depicts a look-up table suitable for mapping data generated by the different type accounting software packages, in accordance with the present invention.

FIG. 3 depicts a data look-up table 300. Table 300 is used by the mapping software 140 to map of extracted data, which represents the information shown on checks 200a–200c and remittance information documents 205a–205c in FIGS. 2A–2C, to the appropriate identifier for the applicable type of data. For example, by entering the look-up table 300 with an location of the applicable area, e.g. 210a, associated with the extracted data, the applicable area can be matched with an area 310 in the table 300 and mapped to an identifier 320 to properly identify the type of data extracted from area 210a as payee name data. As discussed above and shown in FIG. 3, data from areas as 210a–210c are each mapped to a payee name type data identifier in the table 300. Thus, notwithstanding the different locations of payee name information as represented in the differently respective structured data output by the different accounting packages 110a–110c or as it appears on the respective checks 200a–200c printed in accordance with the different accounting software packages 110a–110c, the payee name data can be properly identified through the operation of the mapping software 140 by the PC's 100a–100c. Similarly, differently structured data representing each of the other types of relevant information which is printed on checks 200a–200c and remittance documents 205a–205c in accordance with the different accounting software packages 110a–110c are readily identified as the particular type data by the mapping software 140 using the location at which the represented information would be printed on the applicable check or remittance document.

The import engine software 150 directs the PC's 110a–100c to perform certain other processing tasks on the unstructured records. In the preferred implementation, information in the unstructured records is checked to ensure that the designated states and zip codes are consistent, that the invoice number(s) in the remittance information have a required number of digits, and to identify other possible errors in the data generated in accordance with the applicable accounting software package, as will be recognized by those skilled in the art. Further, certain data may be mapped to corresponding compressed data in accordance with the import engine software 150.

In this later regard, all known databases have limitations on the size of specific records. For example, respective databases associated with different programmed software applications may limit the fields for storing a "name" and/or an "address" within the database to different numbers of characters. Additionally, the underlying database structures for a specific type of record may have different contents depending upon the particular software application used. Hence, one software application package may allow a user to specify data on up to three address lines for a specific record, while another may only allow the user to specify data on only two address lines for a similar record.

These inconsistencies exist in the databases of the various different accounting software applications which are currently in use and are likely to exist in future accounting packages. Hence, the field limitations are not presently and are not likely to become consistent across the universe of accounting software packages. In general, each accounting software application has different structure and size limitations which effect the way information is cataloged.

This inconsistency poses specific issues. For example, payee records from different accounting software packages having different limitations will necessarily affect the way information is presented by the different accounting software applications and must be stored in a database, which has a structure with its own set of limitations, by the import engine software.

To address the inconsistency between the different accounting software applications 110a–110c as well as the inconsistencies between the data generated by the accounting software applications 110a–110c and the database which is required by the electronic bill payment processor 1000, and hence must be generated by PC's 100a–100c in accordance with the import engine software, "payee aliasing" is utilized. Payee aliasing allows a user to specify payee information in a way that it complies with limitations established by the electronic bill payment processor 1000 for the database to be created by each of the processors 100a–100c, in accordance with the import engine software, using data generated by any of the accounting software applications 110a–110c, without modifying the original record created by the applicable accounting software package.

More particularly, and as will be further described below, each of the PC's 100a–100c, operating the import engine software 150, processes data output from the applicable accounting software application 110a–110c which represent new payee records as they are encountered. This data is processed to determine if each new record will fit into the electronic bill payment database without modification. If so, the record is added to a database of acceptable records and the processing continues uninterrupted. If not, the PC 100a–100c, in accordance with the import engine software 150, reformats the record so as to comply with the required database structure and size limitations. For example, the payee name and/or payee address may be truncated or certain fields may be combined based on some simplistic rules. Other techniques, which will be understood by those skilled in the art, could also be used.

Figure 4:
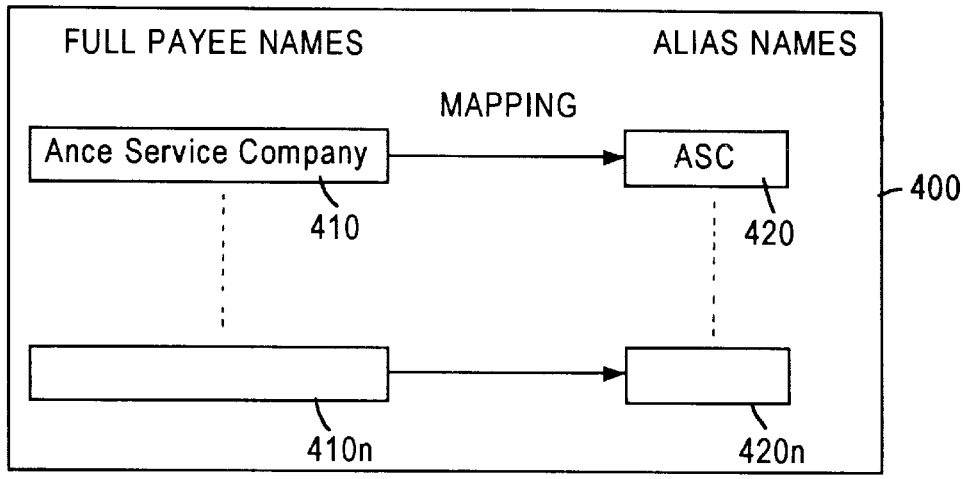
FIG. 4 depicts a name alias database, in accordance with the present invention.

In the preferred embodiment, the import engine software 150 generates a proposed alias and queries the user for approval of or modifications to the proposed alias prior to storing the approved, and in some cases modified, alias for subsequent mapping. In this regard, the reformatted information is displayed to the user. The user can review the displayed information and determine if the reformatted information is acceptable or if the further reformatting of the payee name and/or payee address is desired. For example the user may want to shorten the payee name or address in some other way, such as by using a different abbreviation, etc. After the user has approved or modified the reformatted payee name and/or payee address, this information is stored as a "reduced character" representation of the full payee record in a database accessible by the applicable PC 100a–100c during operation of the import engine software 150. By accessing the database, extracted data representing full-length name and/or address information can be automatically mapped by the import engine software 150 to the applicable alias name and/or address. For example, if the number of characters and spaces in the payee name or payee address exceeds the number of payee name or address characters and spaces which can be processed by the electronic bill payment processor 1000, the PC's 100a–100c, in accordance with the import engine software 150, will automatically map the payee name data to a previously generated and stored alias having less characters. In such a case, the alias is utilized in the downstream electronic bill payment processing of the data FIG. 4 depicts further details of the name alias database 400 which forms part of a database 150a shown in FIG. 1. It will be recognized by those skilled in the art that the database 150c could, if desired, be located remotely rather than locally so long as the database 400 is accessible to the applicable PC 100a–100c. The database 400 is accessed using the import engine software 150 to map full payee names 410 . . . 410n, which are represented in the unstructured data extracted by the mapping software 140 from the structured data generated by the applicable accounting software package 110a–110c, to a shortened payee name alias 420 . . . 420n. Although each full payee name 410 . . . 410n is shown to have a related alias 420 . . . 420n in FIG. 4, it will be recognized that the database 400 will typically include hundreds if not thousands or tens of thousands of different full payee names, and only some of these will normally be stored in relationship with an associated name alias. It will also be understood that each stored alias will customarily be different than the other stored aliases.

To use the database 400, the import engine software 150 first directs the applicable PC 100a–100c to determine if the length of the payee name, identified in the extracted data by mapping software, exceeds an allowable length. If so, software 150 directs the PC to enter the database 400 and compare the extracted data representing the payee name with the full payee names 410 . . . 410n stored in the database 400. If a match is found, the matched data is mapped to its associated alias payee name data 420 . . . 420n and the related alias payee name data is retrieved from the database. The applicable payee name alias data 420 . . . 420n is utilized in lieu of the extracted payee name data for further electronic bill payment processing.

For purposes of this discussion and as shown in FIG. 4, we assume that the payee name "Acne Service Company" is extracted and, based upon a location corresponding an area 210a–210c on a check 200a–200c, identified as payee name data by the mapping software 140. It is also assumed that the electronic bill payment processor 1000 is configured to process payee names which do not exceed a total length of 10 characters and spaces. The applicable PC, operating the import engine software 150, first determines the length of the extracted payee name from the extracted payee name data. In this case, the PC determines that the extracted payee name includes 18 characters and 2 spaces. The PC next determines that this length exceeds the allowed 10 characters and spaces and hence the extracted payee name must be compressed prior to presentation to the bill payment processor 1000. Accordingly, the PC is directed by the import engine software 150 to enter the database 400 and compare the extracted payee name data with the full payee name data 410 . . . 410n stored in the database. The extracted payee name data is match to the full payee name data 410. The full payee name data 410 is then mapped to the alias data 420 representing the payee name alias "ASC" in the database. The payee name alias data 420 representing "ASC" is retrieved from the database and substituted for the extracted payee name data.

A similar problem may arise if the number of characters in a payees address exceed the number of address characters which can be processed by the electronic bill payment processor 1000. Here again, the PC's 100a–100c, in accordance with the import engine software 150, with or without input from the user, may generate an alias address to which the full address is mapped.

Figure 5:
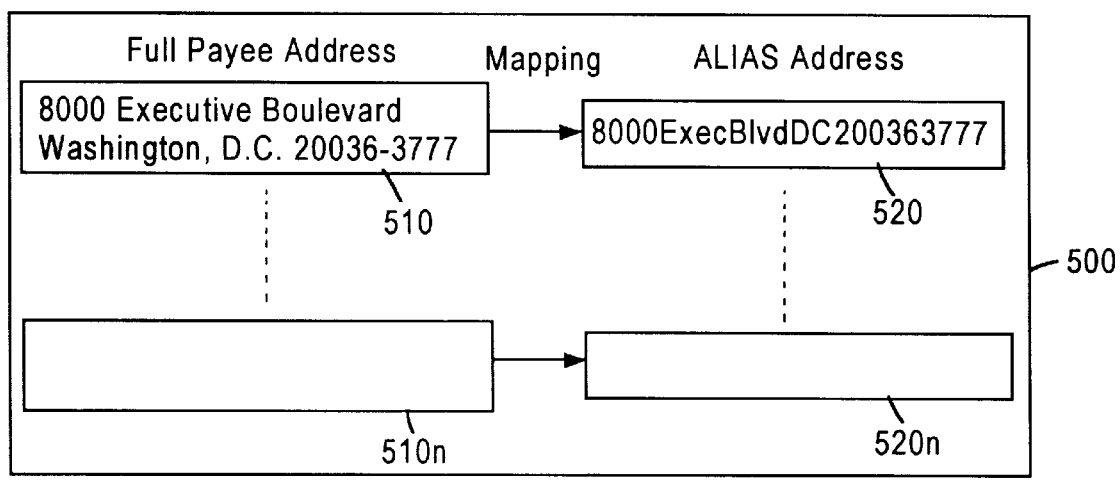
FIG. 5 depicts an address alias database, in accordance with the present invention.

FIG. 5 depicts further details of the address alias database 500 which also forms part of the database 150a shown in FIG. 1. Here again, if desired, database 150a could be stored remotely rather than locally. The database 500 is accessed using the import engine software 150 to map the full payee address, which is represented in the unstructured data extracted by the mapping software 140 from the structured data output of the applicable accounting software package 110a–110c, to a shortened payee address alias. Although each full payee address 510 . . . 510n is shown to have a related alias 520 . . . 520n in FIG. 5, it will be recognized that the database 500 will typically include hundreds if not thousands or tens of thousands of different full payee addresses, and only some of these will normally be stored in relationship with an associated address alias. It will also be understood that each stored alias will customarily be different than the other stored aliases.

To use the database 500, the import engine software 150 directs the applicable PC 100a–100c to determine if the length of the payee address represented in the extracted unstructured data exceeds an allowable length. If so, software 150 directs the PC 100a–100c to enter the database 500 and compare the extracted payee address data with the full payee address data 510 . . . 510n stored in the database. If a match is found with the data 510 . . . 510n, the matched full length payee address data 510 . . . 510n is mapped to its associated payee address alias data 520 . . . 520n and the applicable alias data 520 . . . 520n is retrieved from the database 500. The retrieved payee address alias data is utilized in lieu of the extracted payee address data for further electronic bill payment processing.

For purposes of this discussion, it is assumed that the payee address "8000 Executive Boulevard, Washington, D.C. 20036-3777" is extracted and, based upon a location corresponding to an area 215a–215c on a check 200a–200c, identified as payee address data by the mapping software 140. It is also assumed that the electronic bill payment processor 1000 is configured to process payee addresses which do not exceed a total length of 24 characters and spaces. The applicable PC, operating the import engine software 150, first determines the length of the payee address represented by the extracted payee address data. In this case, the PC determines that the extracted payee address includes 48 characters and 5 spaces. The PC next determines that the determined length exceeds the allowed 24 characters and spaces and hence the extracted payee address data must be compressed prior to presentation to the bill payment processor 1000. Accordingly, the PC is directed by the import engine software 150 to enter the database 500 and compare the extracted payee address data with the full payee address data 510 . . . 510n stored in the database. The extracted payee address data matches the full-length payee address data 510 in the database 500. Accordingly, the full payee address data 510 is mapped to the payee address alias data 520 representing the address alias "8000ExecBlvd,DC, 200363777" in the database. The payee address alias data 520 is retrieved from the database 500 and substituted for the extracted payee address data.

One dilemma created by this approach is matching the original payee record created by the applicable accounting software package 110a–110c with the reduced character representations, i.e. the aliases. If there is no match between the records, the processing must be interrupted so that a reduced character representation, i.e. a payee name/address alias, can be created and preferably reviewed and approved by the user. Hence, manual intervention by the user will normally be required each time a payment is to be approved to an unmatched payee.

To eliminate this problem, a numeric representation of the original payee record output from the applicable accounting software package 110a–110c, which is sometimes referred to as a digital signature, is generated and stored with the reduced character representation(s). This numeric representation is preferably created using common 32-bit CRC functions, although other functions could be used. The CRC function is preferably applied to certain data, such as the payee name and address, and if desired other non-varying payee information such as the payee account and/or phone number etc., from within the record. Thus, the applicable PC 100a–100c, operating the import engine software 150, computes a numeric representation for each payee name and address, and perhaps other information, received in the unstructured data from the mapping software 140.

If the numeric matches a numeric in an existing database record, then it is clear that the record has been previously reviewed. If the no match is found, the calculated numeric, e.g. the calculated CRC value, is new and, since the payee record has not been previously processed, it can be identified as a new record. In this later case, electronic bill payment processing must be interrupted to determine if aliases are needed and, if so to generate, preferably obtain user approval of, and store the aliases in the database 150a.

Based on probabilistic models, it is beneficial to calculate two numeric values for each payee. Using information from the payee, a first numeric value can be calculated by stringing the payee data, e.g. the payee name, address lines, city, state, zip and payee account number from beginning to end and a second numeric value by stringing the same data together from the end to the beginning. By using these dual computations, the possibility of a "collision" of numeric values, i.e. two different payees being associated with the same values, can be kept to nearly zero. This methodology was tested on a database of over 10 million payee records, and resulted in no duplicates. More particularly, we tested this algorithm by performing both the general statistical testing and practical testing. In the general statistical test, given that the CRCs are represented by 64 bits, the number of valid values is $2^{64}$. Therefore, the probability of picking any one CRC value is $1/(2^{64})$, or 1 out of 18.4 quintrillion. We calculated the chance of having a duplicate in any given database of 10,000 records of 64-bit CRC values. This works out to 1 in 369.1 billion. In the practical test, using a database of 10,000,000 business records, including names and addresses, we calculated the two 32-bit CRC values, i.e. one forward and one backward. The result was that there were no duplicates, that is no two records were represented by the same 64-bit combination in this test.

To ensure that the correct mapping is performed efficiently, the numeric value of the full-length data created by the import engine software 150 forms a digital signature which in, say, 64 bytes of data uniquely represent the full payee record. The digital signatures are, in accordance with instructions from the import engine software 150, stored in the database 150a. As digital signatures are formed for greater and greater numbers of payees, the electronic bill payment processing becomes more and more seamless from the standpoint of the user. Once the database of digital signatures has been initially developed, automatic processing of electronic bill payments need only be interrupted to perform data checks and modifications if a new payee record is identified in the data output by the applicable accounting software 110a–110c.

Figure 6:
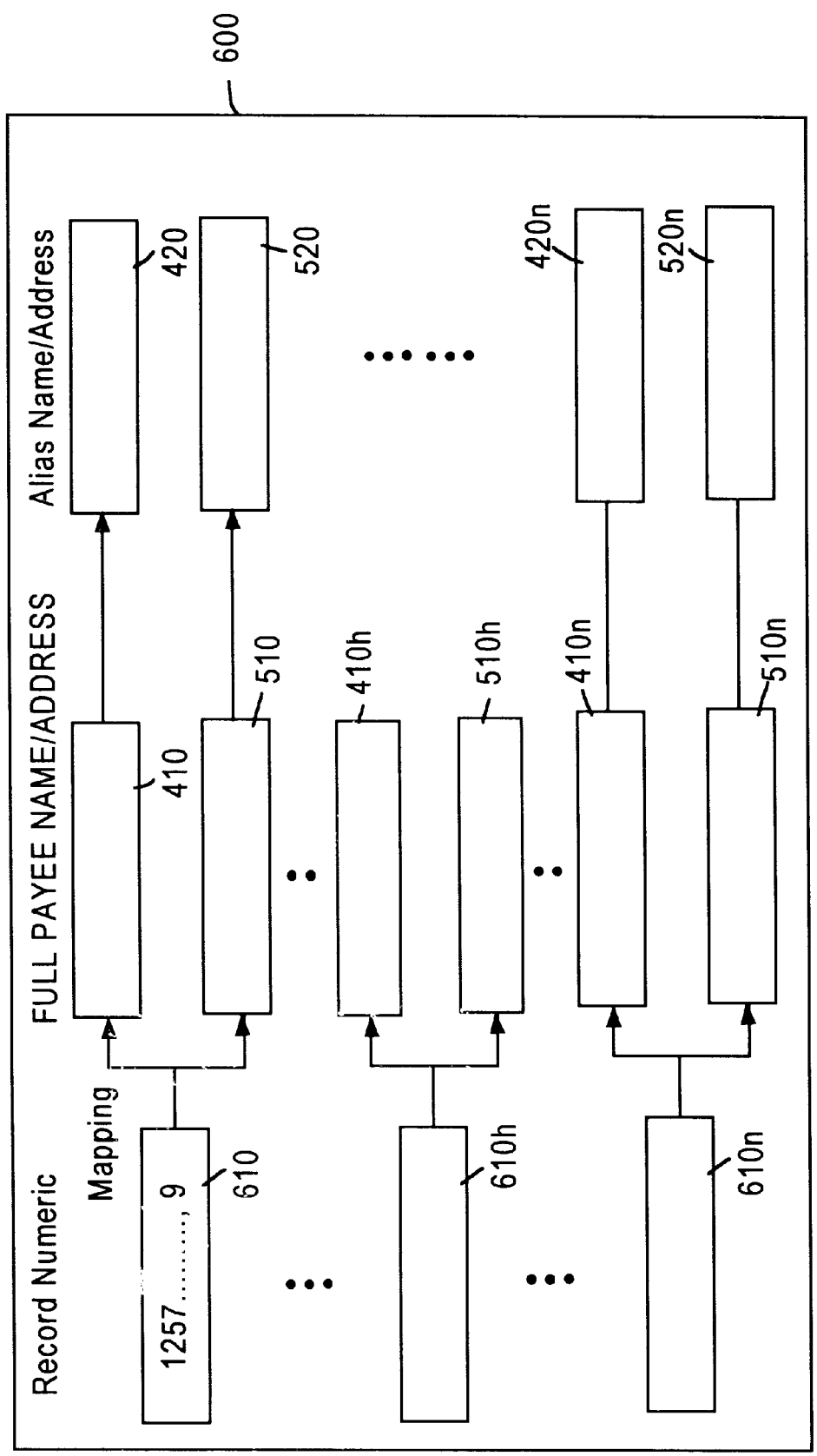
FIG. 6 depicts a numeric representation database, in accordance with the present invention.

FIG. 6 depicts further details of the numeric representation database 600 which also forms part of the database 150a shown in FIG. 1. If desired, database 600 could alternatively be stored remotely rather than locally. The database 600 is accessed using the import engine software 150 to map the computed numeric value for the payee name, address and perhaps other non-varying payee related information extracted by the mapping software 140 and included in the unstructured data received by the import engine software 150. That is, by accessing the database 600, the computed numeric value can be mapped to the applicable full payee name 410 . . . 410n and full payee address 510 . . . 510n and ultimately to the applicable shortened payee name alias 420 . . . 420n and shortened payee address alias 520 . . . 520n, as also described above with reference to FIGS. 4 and 5. Only some of numeric values 610 . . . 610n are shown to have a related alias 420 . . . 420n and 520 . . . 520n in FIG. 6. Others, e.g. value 610h, only have related full payee names and addresses 410 . . . 410n and 510 . . . 510n. This reflects the fact that the database 600 will typically include hundreds, if not thousands or tens of thousands, of different numeric values and that some of these values will normally be associated with payees whose full names and addresses are acceptable for electronic bill payment processing, and hence need not be shortened.

To use the database 600, the import engine software 150 directs the applicable PC 100a–100c to compute a numeric value for the extracted data which has been identified as name, address and optionally other type non-varying payee information. Software 150 directs the applicable PC 100a–100c to enter the database 600 and compare the computed value with the numeric values 610 . . . 610n stored in the database. If a match is found, the matched numeric is mapped to its associated full payee name 410 . . . 410n and full payee address 510 . . . 510n and then to the associated payee name alias 420 . . . 420n and the associated payee address alias 520 . . . 520n, if applicable. The applicable full name and/or address data or alias name and/or address data are retrieved from the database 600 and, as previously described, utilized for further electronic bill payment processing.

For purposes of this discussion, it is assumed that the payee name "Acne Service Company" and the payee address "8000 Executive Boulevard, Washington, D.C. 20036-3777" are extracted by the applicable PC 100a–100c, in accordance with the mapping software 140, from data representing the information shown in areas 210a–210c and 215a–215c on the check 200a–200c associated with the applicable accounting software application 110a–110c. The applicable PC 100a–100c, operating the import engine software 150, first computes a numeric value using the extracted full payee name and full payee address data. In this case, the applicable PC computes a numeric value 1257 . . . 9. The applicable PC is next directed by the import engine software 150 to enter the database 600 and compare the computed value with the numeric values 610 . . . 610n stored in the database. A match with the stored value 610 is determined. The matched numeric 610 is then mapped to the full payee name data 410 and full payee address data 510 and then further mapped to the alias name data 420 representing "ASC" and the alias address data 520 representing "8000ExecBlvd,DC,200363777" in the database 600. The payee name and address alias data representing "ASC" and "8000ExecBlvd,DC,200363777" are retrieved from the database 600 and substituted for the extracted full payee name and address data.

If the computed numeric value is determined to match with the numeric value 610h stored in database 600, the matched numeric 610h would only be mapped to the full payee name data 410h and full payee address data 510h in the database 600. The full length payee name and address data 410h and 510h would be retrieved from the database 600, substituted for the extracted full payee name and address data and used for electronic bill payment processing.

The processing performed by the bill payment processor 1000 is not directly affected by use of reduced character representations. However, there is additional processing that must take place at the processor 1000 in this regard. The applicable PC 100i a–100c sends the reduced character representation to processor 1000 whenever a new payee is added by the applicable user. The payee record is processed by the electronic bill payment processor 1000 at that time to achieve two conditions. The first condition is to ensure that the mailing address of the new payee complies with the USPS rules and regulations that apply to preferred pre-sort mail. The second condition is to ensure that, even if other users identify the same payee in a slightly different manner, the processor 1000 will have the ability to treat payments of all users to the payee in the same manner and, if desired, to consolidate payments from all users to a particular payee, thereby achieving improved operating efficiency and reduced costs.

To meet the first condition, initial validation on the payee record is performed against an existing database 1010, as shown in FIG. 1, of known US postal addresses to create an optimal mailing address, where possible. With respect to the second condition, certain elements from the payee record, e.g. the phone number, some number of characters in the payee name, and the zip code, are compared to an existing database 1020, as shown in FIG. 1, of similar elements for other payees to determine if the payee already exists on the system. If so, pointers are established so all users authorizing payments to the same payee will be treated in a uniform manner, and, if desired, consolidated into one payment which can be made either electronically or by paper.

The first step in a typical practical implementation of electronic bill payments is for the user to complete a paper enrollment form and forward it to the service provider. Along with the basic information which identifies the user, such as the user's name and address, the user also provides a voided check for each account that the user wishes to enable for electronic bill payments, i.e. to utilize in the payment of bills. These accounts will, most often, be deposit or credit accounts maintained by one or more financial institute on the user's behalf. These accounts may, for example, be checking, money market, home equity, credit line or other type accounts.

Typically, the service provider staff physically read the line at the bottom of the check, commonly referred to as the MICR line, to obtain the account information, e.g. the routing/transit and account numbers, for the applicable accounts. The format of these fields is then preferably validated using previously stored data associated with each financial institute maintained in a database 1030 to ensure compliance with the applicable financial institute's account formats, e.g. the use of spaces or hyphens. The account information is then stored in a database 1040 accessible to the bill payment processor 1000.

The applicable PC 110a–110c, in accordance with its programmed accounting application 110a–110c, generates and outputs structured data including payment and remittance data for each of multiple payees. Based upon the user's selection of the virtual printer 130 from the printer options, the structured data output is either redirected or co-directed by the applicable PC in accordance with the mapping software 140. Operating the mapping software 140, the applicable PC 100a–100c extracts the payment and remittance information from the structured data, and identifies the specific portions of extracted data which represent each particular type of information based upon the location at which that information would be printed on a check and remittance information document using the structured data.

Next, the applicable PC 100a–100c, in accordance with instructions from import engine software 150, processes the unstructured records created in accordance with the mapping software 140. This processing includes validating the unstructured data by, for example, ensuring that numeric characters appear in number fields, alpha characters appear in text fields, the zip code is five or nine digits, the payment amount does not exceed some predetermined threshold, the state designation is represented by a valid state code, and the state designation and zip code are consistent. If any of this data appears to be incorrect, the user is queried and requested to correct the anomalous information.

The processing also includes modifying data so as to be in a preferred condition for further downstream processing. For example, if the unstructured data represents full state name information, the import engine software 150 will cause the applicable PC 110a–100c to automatically modify the data to reduce the state name information provided in the unstructured data to the applicable two-letter state code.

The processing further includes stringing together the payee name and address data, as well as other non-varying data identifying the payee, if available in the unstructured data from the mapping software 140. Such other data could, for example, include an account number, telephone number etc. The strung together data is processed in accordance with the import engine software 150 to compute a digital signature. The computed digital signature is compared to digital signatures stored within the database 150a which is preferably, but not necessarily, maintained on the applicable PC 100a–100c to identify the applicable payee name and address data, whether full or shortened, which will be used in the further electronic bill payment processing. The applicable PC 110a–110c, operating the import engine software 150, then stores the identified payee name and address, the payment data and the remittance data in the structured database 150b. Different types of data included in the received unstructured data are stored in different predefined locations within the database 150b. The database 150b preferably resides on the applicable PC 100a–100c, although this is not mandatory. The applicable PC then uploads the database 150b to the electronic bill payment processor 1000 for further processing. It should however be understood that the database 150b may, if desired, be transmitted to the bill payment processor 1000 another device interconnected, e.g. networked, to the PC which processed the data.

In summary, the applicable PC, operating the import engine software 150, extracts, from the unstructured data records, data representing the payee identification, the payment information and the remittance information, substitutes data representing full or alias name and address information for applicable extracted data, and stores the substituted payee identification data and the payment and remittance data as a normalized database of information which can be utilized by the electronic bill payment processor 1000. Using the database 150b, the electronic bill payment processor 1000 can processes the data generated by various different accounting software packages in a standardized way to make electronic bill payments.

Preferably, the user is allowed to view the information residing in the database 150b prior to transmission of this database of information to the electronic bill payment processor 1000. This allows the user to verify the information prior to transmission to processor 1000. Once verified, the applicable PC 100a–100c, in accordance with the import engine software 150, connects with the bill payment processor 1000 via the network 2000 shown in FIG. 1. Once the connection has been established, the database 150b is uploaded to the bill payment processor 1000. Typically, the database 150b will import payments to the electronic bill payment processor 1000 in batches, i.e. groups of multiple payments, up to several hundred at a time, that are to be paid with funds drawn on the same account. To associate an account with any given payment, the user is prompted by the import engine software 150 at the beginning of every batch import to select the appropriate account from those that have been enabled for electronic bill payments.

Although certain individuals may be authorized to print checks, the signatures of different individuals may be required on the checks. Accordingly, a special code or password may need to be input either to the applicable PC 100a–100c and received by the import engine software 150 before transmission of the database 150b to the electronic bill payment processor 1000. Upon transmission of the database 150b, a confirmation number is generated by the electronic bill payment processor 1000 and downloaded to the applicable PC 100a–100c. Responsive to the receipt of the confirmation, the PC, in accordance with the import engine software 150, stores the confirmation in association with the transmitted database of information.

As described in detail above, the present invention provides integrated electronic accounting and bill payment. It will also be recognized by those skilled in the art that, while the invention has been described above in terms of one or more preferred embodiments, it is not limited thereto. Various features and aspects of the above-described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A method for paying bills electronically using data generated by any of multiple accounting software packages, the data generated by each of the multiple accounting software packages having a different structure, comprising the steps of:

storing respective rules associated with each of the multiple accounting software packages;

receiving structured data including data corresponding to a payee name, a payee address, an invoice number and an invoice amount generated by one of the multiple accounting software packages;

extracting the data corresponding to the payee name, the payee address, the invoice number and the invoice amount from the received structured data by applying only the respective rules associated with the one accounting software package;

mapping the extracted data such that the extracted data corresponding to the payee name is identified as first type data, the extracted data corresponding to the payee address is identified as second type data, the extracted data corresponding to the invoice number is identified as third type data, and the extracted data corresponding to the invoice amount is identified as fourth type data;

storing a representation of the extracted data corresponding to the payee name in a database at a first location based upon such data being identified as the first type data, storing a representation of the extracted data corresponding to the payee address in the database at a second location based upon such data being identified as the second type data, storing a representation of the extracted data corresponding to the invoice number in the database at a third location based upon such data being identified as the third type data, and storing a representation of the extracted data corresponding to the invoice amount in the database at a location based upon such data being identified as the fourth type data; and reading representations of the extracted data from the database and processing the read data to electronically process payment of the invoice amount.

2. A method according to claim 1, further comprising the step of:

directing the structured data to a virtual printer;

wherein the received structured data is the structured data directed to the virtual printer.

3. A method according to claim 1, wherein:

the respective rules associated with each of the multiple accounting software packages identify data locations of the data corresponding to the payee name, the payee address, the invoice number and the invoice amount in the received structured data generated by the associated accounting software package.

4. A method according to claim 3, wherein:

the data locations are identified by X-Y coordinates defining areas in which the data corresponding to the payee name, the payee address, the invoice number and the invoice amount are to appear on a document printed in accordance with the structured data.

5. A method according to claim 1, wherein the representation of the extracted data corresponding to the payee name is stored in the database at the first location as a reduced character representation of the extracted data identified as first type data.

6. A method according to claim 1, wherein the representation of the extracted data corresponding to the payee address is stored in the database at the second location as a reduced character representation of the extracted data identified as second type data.

7. A method according to claim 1, further comprising the steps of:

storing a plurality of digital signatures, each corresponding to a different payee name and address;

forming a digital signature using the extracted data identified as first type data and the extracted data identified as second type data;

determining if the formed digital signature matches one of the stored pluralities of digital signatures;

storing the formed digital signature as part of the stored plurality of digital signatures if no match is determined; and storing a reduced character representation of one of the extracted data identified as first type data and the extracted data identified as second type data in association with the stored digital signature;

wherein one of the representation of the extracted data corresponding to the payee name stored in the database at the first location and the representation of the extracted data corresponding to the payee address stored in the database at the second location is the reduced character representation.

8. A system for paying bills electronically, comprising:

a first client memory configured to store respective rules associated with each of first and second programmed accounting instructions;

a second client memory configured to store the respective rules associated with each of the first and the second programmed accounting instructions;

a first client processor configured (i) to generate first data having a first structure, including data corresponding to a payee name, a payee address, a first invoice number and a first invoice amount, in accordance with the first programmed accounting instructions, (ii) to retrieve from the first client memory the respective rules associated with the first programmed accounting instructions, (iii) to extract the data corresponding to the payee name, the payee address, the first invoice number and the first invoice amount from the structured first data by applying the retrieved rules associated with the first programmed accounting instructions, (iv) to map the extracted data such that the extracted data corresponding to the payee name is identified as first type data, the extracted data corresponding to the payee address is identified as second type data, the extracted data corresponding to the first invoice number is identified as third type data, and the extracted data corresponding to the first invoice amount is identified as fourth type data, and (v) to direct storage of a representation of the extracted data corresponding to the payee name in a first database at a first location based upon such data being identified as the first type data, of a representation of the extracted data corresponding to the payee address in the first database at a second location based upon such data being identified as the second type data, of a representation of the extracted data corresponding to the first invoice number in the first database at a third location based upon such data being identified as the third type data, and of a representation of the extracted data corresponding to the first invoice amount in the first database at a fourth location based upon such data being identified as the fourth type data;

a second client processor configured (i) to generate second data having a second structure different than the first structure, including data corresponding to the payee name, the payee address, a second invoice number and a second invoice amount, in accordance with the second programmed accounting instructions, the second structure being different than the first structure, (ii) to retrieve from the second client memory the respective rules associated with the second programmed accounting instructions, (iii) to extract the data corresponding to the payee name, the payee address, the second invoice number and the second invoice amount from the second data by applying the retrieved rules associated with the second programmed accounting instructions, (iv) to map the extracted data such that the extracted data corresponding to the payee name is identified as the first type data, the extracted data corresponding to the payee address is identified as the second type data, the extracted data corresponding to the second invoice number is identified as the third type data, and the extracted data corresponding to the second invoice amount is identified as the fourth type data, and (v) to direct storage of a representation of the extracted data corresponding to the payee name in a second database at the first location based upon such data being identified as the first type data, of a representation of the extracted data corresponding to the payee address in the second database at the second location based upon such data being identified as the second type data, of a representation of the extracted data corresponding to the second invoice number in the second database at the third location based upon such data being identified as the third type data, and of a representation of the extracted data corresponding to the second invoice amount in the database at the fourth location based upon such data being identified as the fourth type data; and a bill payment processor configured to (i) read the representations of the extracted data at the first, the second, the third and the fourth locations in the first database and the representations of the extracted data at the first, the second, the third and the fourth locations in the second database and (ii) to process the read data to electronically process a single payment which includes the first and the second invoice amounts.

9. A system according to claim 8, further comprising:

a first user input device interconnected to the first client processor and configured to receive a user printer selection of one of a first real printer and a first virtual printer; and a second user input device interconnected to the second client processor and configured to receive a user printer selection of one of a second real printer and a second virtual printer;

wherein the first client processor extracts the data, maps the extracted data, and directs the storage of the representation of the extracted data responsive to selection of the first virtual printer being received by the first user input device;

wherein the second client processor extracts the data, maps the extracted data, and directs the storage of the representation of the extracted data responsive to selection of the second virtual printer being received by the second user input device.

10. A system according to claim 8, wherein:

the respective rules associated with the first programmed accounting instructions identify first data locations of the data corresponding to the payee name, the payee address, the first invoice number and the first invoice amount in the first data and the respective rules associated with the second programmed accounting instructions identify second data locations of the data corresponding to the payee name, the payee address, the second invoice number and the second invoice amount in the second data.

11. A system according to claim 10, wherein:

the first data locations are identified by X-Y coordinates of the data corresponding to the payee name, the payee address, the first invoice number and the first invoice amount as the data are to appear on a document printed in accordance with the first data; and the second locations are identified by X-Y coordinates of the data corresponding to the payee name, the payee address, the second invoice number and the second invoice amount as the data are to appear on a document printed in accordance with the second data.

12. A system according to claim 8, wherein at least one of the representation of the extracted data corresponding to the payee name stored in the first database at the first location is a reduced character representation of the extracted data identified as first type data and the representation of the extracted data corresponding to the payee address stored in the first database at the second location is a reduced character representation of the extracted data identified as second type data.

13. A system according to claim 8, wherein:

the first client memory is further configured to store a plurality of digital signatures, each corresponding to a different payee name and address;

the first client processor is further configured to form a digital signature using the extracted data identified as first type data and the extracted data identified as second type data, to determine if the formed digital signature matches one of the stored plurality of digital signatures, to store the formed digital signature as part of the stored plurality of digital signatures if no match is determined, and to store a reduced character representation of at least one of the extracted data identified as first type data and the extracted data identified as second type data in association with the digital signature.

14. A system for paying a bill electronically, comprising:

memory configured to store (i) one of first programmed accounting instructions and second programmed accounting instructions, (ii) programmed mapping instruction including respective rules associated with each of the first and the second programmed accounting instructions, and (iii) programmed import instructions; and a processor configured to:

generate structured data for making payment on a bill, including data corresponding to a payee name, a payee address, a invoice number and a invoice amount, in accordance with the stored programmed accounting instructions, extract the data corresponding to the payee name, the payee address, the invoice number and the invoice amount from the structured data, in accordance with the programmed mapping instruction, by applying the stored respective rules associated with the stored programmed accounting instructions, store, in a database, a representation of the extracted data corresponding to the payee name at a first location, a representation of the extracted data corresponding to the payee address at a second location, a representation of the extracted data corresponding to the invoice number at a third location, and a representation of the extracted data corresponding to the invoice amount at a fourth location, in accordance with the programmed import instructions, and transmit the database to another processor for processing of the representations of the extracted data to electronically pay the bill.

15. A system according to claim 14, wherein:

the processor is further configured to map the extracted data, in accordance with the programmed mapping instructions, such that the extracted data corresponding to the payee name is identified as first type data, the extracted data corresponding to the payee address is identified as second type data, the extracted data corresponding to the invoice number is identified as third type data, and the extracted data corresponding to the invoice amount is identified as fourth type data, and to store, in accordance with the programmed import instructions, each of the representations of the extracted data at a respective one of the locations in the database based upon the identification of that extracted data as a particular type of data.

16. A system according to claim 14, wherein the processor is further configured to:

receive a command representing a selection of one of a first printer option for performing a print function and a second printer option for performing an electronic bill processing function; and to extract the data, store the extracted data in the database and transmit the database only if the received command represents the selection of the second printer option.

17. A system according to claim 16, further comprising:

a user input device for inputting the command; and a printer operable to perform the print function;

wherein the processor is further configured to transmit the generated structured data to the printer if the received command represents the selection of the first printer option and the printer operates to perform the print function responsive to the transmission of the generated structured data by printing a check to pay the bill.

18. A system according to claim 14, wherein:

the rules associated with the first programmed accounting instructions identify locations of the data corresponding to the payee name, the payee address, the invoice number and the invoice amount in structured data generated in accordance with the first programmed accounting instructions and the rules associated with the second programmed accounting instructions identify locations of the data corresponding to the payee name, the payee address, the invoice number and the invoice amount in structured data generated in accordance with the second programmed accounting instructions.

19. A system according to claim 14, wherein:

at least one of the representation of the extracted data corresponding to the payee name stored in the database at the first location is a reduced character representation of the extracted data identified as first type data and the representation of the extracted data corresponding to the payee address stored in the database at the second location is a reduced character representation of the extracted data identified as second type data.

20. A system according to claim 14, wherein:

the memory is further configured to store a plurality of digital signatures each corresponding to a different payee name and address;

the processor is further configured to form a digital signature using the extracted data corresponding to the payee name and the extracted data corresponding to the payee address, to determine if the formed digital signature matches one of the stored plurality of digital signatures, to store the formed digital signature as part of the stored plurality of digital signatures if no match is determined, and to store a reduced character representation of one of the extracted data corresponding to the payee name and the extracted data corresponding to the payee address in association with the stored digital signature.

21. An article of manufacture for paying a bill electronically, comprising:

a computer readable storage medium; and computer programming stored on the medium and configured to be readable from the medium by a computer processor and thereby cause the processor to operate so as to:

receive data for making payment of a bill, including data corresponding to a payee name, a payee address, an invoice number and an invoice amount, the received data having one of a first data structure and a second data structure different than the first data structure;

select from rules associated with the first data structure and the second data structure, the rules associated with the one data structure;

extract the data corresponding to the payee name, the payee address, the invoice number and the invoice amount from the received data by applying the selected rules;

map the extracted data such that the extracted data corresponding to the payee name is identified as first type data, the extracted data corresponding to the payee address is identified as second type data, the extracted data corresponding to the invoice number is identified as third type data, and the extracted data corresponding to the invoice amount is identified as fourth type data;

generate a database having a representation of the extracted data corresponding to the payee name, a representation of the extracted data corresponding to the payee address, a representation of the extracted data corresponding to the invoice number, and a representation of the extracted data corresponding to the invoice amount at predetermined locations within the database; and transmit the database for processing of the representations of the extracted data to electronically pay the bill;

wherein the database is generated such that each of the representations of the extracted data is at a respective predetermined location in the database based upon the identification of that extracted data as a particular type of data.

22. An article of manufacture according to claim 21, wherein the computer programming is further configured to cause the processor to operate so as to:

receive a command representing a selection of one of a first printer option for performing a print function and a second printer option for performing an electronic bill processing function; and extract the data, select from the rules, generate the database and transmit the database only if the received command represents the selection of the second printer option.

23. An article of manufacture according to claim 22, wherein the computer programming is further configured to cause the processor to operate so as to:

transmit the generated data for printing of the generated data to pay the bill if the received command represents the selection of the first printer option.

24. An article of manufacture according to claim 21, wherein:
    the computer programming is further configured to cause the processor to operate so as to generate a reduced character representation of the extracted data corresponding to the payee name; and
    the representation of the extracted data corresponding to the payee name in the database is the reduced character representation.

25. An article of manufacture according to claim 21, wherein:
    the computer programming is further configured to cause the processor to operate so as to generate a reduced character representation of the extracted data corresponding to the payee address; and
    the representation of the extracted data corresponding to the payee address in the database is the reduced character representation.

26. An article of manufacture according to claim 21, wherein: the computer programming is further configured to cause the processor to operate so as to:
    generate a digital signature using the extracted data corresponding to the payee name and the extracted data corresponding to the payee address;
    determine if the generated digital signature matches one of a plurality of stored generated digital signatures;
    if no match is determined, generate a reduced character representation of one of the extracted data corresponding to the payee name and the extracted data corresponding to the payee address, and store the generated digital signature in association with the reduced character representation, as part of the plurality of stored digital signatures.

* * * * *